United States Patent
Hosoi et al.

(10) Patent No.: US 11,027,586 B2
(45) Date of Patent: Jun. 8, 2021

(54) VEHICLE SUSPENSION MEMBER

(71) Applicant: Kobe Steel, Ltd., Kobe (JP)

(72) Inventors: Hiroaki Hosoi, Kobe (JP); Hajime Nakamura, Inabe (JP)

(73) Assignee: Kobe Steel, Ltd., Kobe (JP)

( * ) Notice: Subject to any disclaimer, the term of this patent is extended or adjusted under 35 U.S.C. 154(b) by 176 days.

(21) Appl. No.: 16/452,581

(22) Filed: Jun. 26, 2019

(65) Prior Publication Data
US 2020/0001674 A1 Jan. 2, 2020

(30) Foreign Application Priority Data
Jun. 27, 2018 (JP) .............................. JP2018-121458

(51) Int. Cl.
*B60G 7/00* (2006.01)

(52) U.S. Cl.
CPC ............ *B60G 7/001* (2013.01); *B60G 7/005* (2013.01); *B60G 2204/148* (2013.01); *B60G 2204/416* (2013.01); *B60G 2206/014* (2013.01); *B60G 2206/122* (2013.01); *B60G 2206/7102* (2013.01)

(58) Field of Classification Search
CPC .. B60G 7/001; B60G 7/005; B60G 2206/122; B60G 2206/7102; B60G 2204/148; B60G 2204/416; B60G 2206/014; B60G 2206/8111; B60G 2206/8106; B60G 2206/017; B60G 2206/81022; B60G 2206/016; B60G 2200/144; B60G 7/00; F16C 2326/05
See application file for complete search history.

(56) References Cited

U.S. PATENT DOCUMENTS

| | | | |
|---|---|---|---|
| 2011/0298192 A1* | 12/2011 | Yu ........................... | B60G 7/001 280/124.134 |
| 2012/0021241 A1* | 1/2012 | Perry ...................... | B60G 3/04 428/594 |
| 2015/0001826 A1* | 1/2015 | Hosoi ....................... | C22F 1/04 280/124.134 |
| 2016/0347138 A1* | 12/2016 | Suzuki .................... | B60G 7/001 |
| 2019/0061452 A1* | 2/2019 | Lee ......................... | F16C 11/06 |
| 2019/0308475 A1* | 10/2019 | Wentworth ............ | B60G 7/001 |
| 2019/0315173 A1* | 10/2019 | Kim ........................ | B60G 7/001 |
| 2020/0114716 A1* | 4/2020 | Ungruh .................. | B60G 7/001 |

FOREIGN PATENT DOCUMENTS

JP  5-112111  5/1993

* cited by examiner

*Primary Examiner* — Darlene P Condra
(74) *Attorney, Agent, or Firm* — Oblon, McClelland, Maier & Neustadt, L.L.P.

(57) ABSTRACT

Provided is a vehicle suspension member securing a strength against external force in a vehicle longitudinal direction. A lower arm includes an arm body, a front bush support part, a rear bush support part, a ball joint support part, a first rib, a second rib, and a third rib. The third rib is disposed in a lateral part connecting the ball joint support part to the rear bush support part. An S-shaped rib center curve of the third rib intersects with a straight line at an intersection. |(1−S2/S1)|≤0.2 is satisfied, where S1 is area of a first region defined by the rib center curve and the first straight line, and S2 is area of a second region.

3 Claims, 13 Drawing Sheets

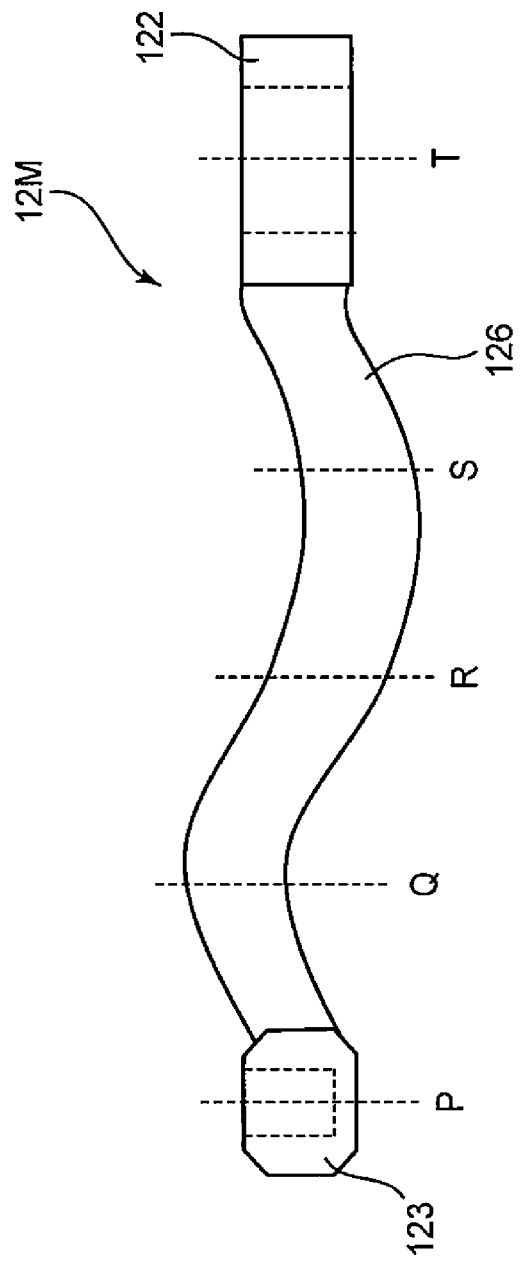

VEHICLE SUSPENSION MEMBER

BACKGROUND

The present invention relates to a vehicle suspension member provided in vehicles such as automobiles.

There has been known a suspension unit that connects a vehicle body to a vehicle wheel and pivotally supports the wheel. The suspension unit has a function of maintaining a posture of the wheel and a function of preventing irregularity (road noise) of a road surface from being transmitted to the vehicle body. Such a suspension unit particularly requires high safety and is determined as an important security component among vehicle components.

A suspension unit having a knuckle member, a lower arm (suspension member), a stabilizer, a tie rod, and a shock absorber is known as the above suspension unit. The knuckle member rotatably supports the wheel while its lower and upper end parts are connected to the lower arm and the shock absorber, respectively.

The suspension member is classified into several types depending on the number of attachment points (pivot points) with other members. The suspension member mainly transmits axial force for two attachment points, while mainly receiving a bending moment and distributing the bending moment to the respective pivot points for three attachment points. Typically, a ball joint is mounted on one pivot point on a tire side while a rubber bush is attached the other pivot point, so that the suspension member is connected to other members. The suspension member is required to have sufficient stiffness and proof stress against an applied load, which is transmitted from a tire along each of a vehicle longitudinal direction, a lateral direction, and a vertical direction, and have durability to withstand long-term use.

On the other hand, other components such as a tire, a drive shaft, a shock absorber, and a coil spring are disposed around the suspension member. The suspension member is therefore necessary to be disposed so as not to interfere with such movable members. As a result, a shape of the suspension member is extremely limited. If a large load is applied to such a suspension member, complicated stress distribution occurs by various types of stress caused by bending deformation, torsional deformation, and axial deformation, and stress concentration overlap.

A typical suspension member having three attachment points includes a known front lower arm or transverse link, in which pivot points are disposed at three apexes of the suspension member having a roughly L shape in top view. In such a suspension member having a roughly L shape, a ball joint support part is disposed outside in a vehicle width direction, and a pair of bush support parts are disposed so as to be in parallel with the vehicle longitudinal direction.

Japanese Unexamined Patent Application Publication No. Hei5(2003)-112111 discloses a suspension arm for an automobile having a roughly L shape in top view. In such a technique, the arm is designed to be commonly used between the right and left sides of a vehicle or between different vehicle types and be made of aluminum to reduce weight of the vehicle. One end of the arm is connected to a knuckle of a wheel via a ball joint, and the other end is attached to a vehicle body via a bush. The arm is configured of a suspension arm body attached to a vehicle body side, and a ball joint bearing having a ball joint welded to the suspension arm body. The ball joint bearing is connected to the suspension arm body in an inserted manner while an attachment position of the ball joint is variable.

SUMMARY

The suspension member having a roughly L shape most importantly have strength (maximum load) against an external force in a vehicle longitudinal direction assuming that a tire collides with an obstacle while the vehicle is moving. An in-plane bending moment mainly occurs in the suspension member due to the external force. At this time, a part of the suspension member receives a compression load, and an out-of-plane bending moment occurs in the periphery of the part. Such an out-of-plane bending moment causes out-of-plane bending deformation of the suspension member, and thus the amount of out-of-plane deformation gradually increases. Such an increase in the amount of out-of-plane deformation further increases the out-of-plane bending moment, and thus the amount of out-of-plane deformation of the suspension member increases at an accelerated rate. The existing suspension member as described in Japanese Unexamined Patent Application Publication No. Hei5(2003)-112111 disadvantageously has an insufficient strength against the external force in the vehicle longitudinal direction as described above.

An object of the invention, which has been made in light of the above-described point, is to provide a vehicle suspension member securing the strength against the external force in a vehicle longitudinal direction.

As a measure to overcome such a disadvantage, a vehicle suspension member of the invention is characterized by a vehicle suspension member made of metal, including: a body part; a first bush support part disposed in the body part; a second bush support part disposed behind the first bush support part in the body part; and a ball joint support part disposed outside in a vehicle width direction of the first bush support part in the body part, where the body part includes a first lateral part to connect the first bush support part to the second bush support part, a second lateral part to connect the first bush support part to the ball joint support part, a third lateral part to connect the ball joint support part to the second bush support part, and a vertical pair of ribs extending from the ball joint support part to the second bush support part in the third lateral part, where a straight line, which connects the ball joint support part to the second bush support part, intersects at a predetermined intersection with a curved line formed by connecting to one another vertically middle points between upper and lower end edges of the vertical pair of ribs from the ball joint support part to the second bush support part, and $|(1-S2/S1)| \leq 0.2$ is satisfied, where S1 is area of a first region defined by the straight line and the curved line between the intersection and the ball joint support part, and S2 is area of a second region defined by the straight line and the curved line between the intersection and the second bush support part.

According to this configuration, the straight line, which connects the ball joint support part to the second bush support part, intersects at the predetermined intersection with the curved line formed by connecting the vertical middle points between the upper and lower end edges of the vertical pair of ribs to one another. When external force in a vehicle longitudinal direction is applied to the vehicle suspension member, an out-of-plane offset direction of the ribs is divided into two vertical (upward and downward) directions with the intersection as a boundary. As a result, a roughly S-shaped bending deformation mode of the ribs is achieved, and the amount of out-of-plane deformation is reduced. This increases the maximum load received by the vehicle suspension member, making it possible to suppress a reduction in load. Consequently, the vehicle suspension member secures the strength against the external force in a vehicle longitudinal direction.

In the above configuration, the body part of the vehicle suspension member is desirably made of aluminum alloy.

According to this configuration, since the body part of the vehicle suspension member is made of aluminum alloy, weight of the vehicle suspension member can be reduced compared with a vehicle suspension member made of steel.

In the above configuration, the body part desirably has an average 0.2%-proof stress of 350 MPa or more and is desirably formed by hot forging.

According to this configuration, the vehicle suspension member can meet a desired strength with reduced weight compared with a case of using another aluminum material.

According to the invention, it is possible to provide a vehicle suspension member securing a strength against an external force in a vehicle longitudinal direction.

BRIEF DESCRIPTION OF THE DRAWINGS

FIG. 17 is a side view of the suspension member of the modified embodiment of the invention.

DETAILED DESCRIPTION

Figure 1:
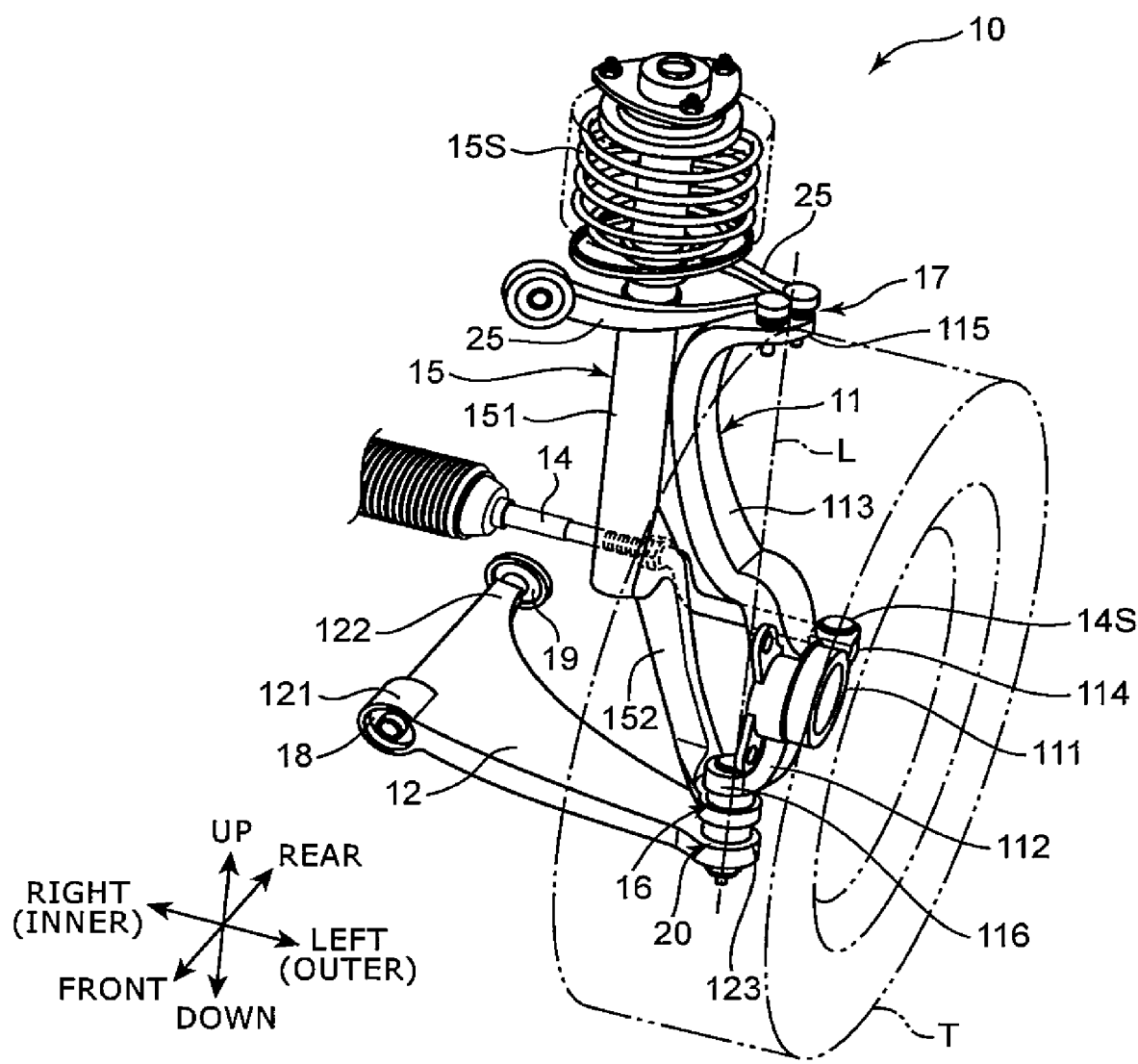
FIG. 1 is a perspective view of a suspension unit including a suspension member according to one embodiment of the invention.

Hereinafter, a suspension member of one embodiment of the invention is generally described. FIG. 1 is a perspective view of a suspension unit 10 of the present embodiment. In the directions shown in FIG. 1, left (out) and right (in) mean a left direction as a direction toward the outside in a vehicle width direction and a right direction as a direction toward the inside in the vehicle width direction, respectively.

The suspension unit 10 is mounted in an undepicted vehicle body of an automobile and supports a wheel T of the vehicle in a rotatable and steerable manner. For example, in the present embodiment, a pair of suspension units 10 are disposed in correspondence to the respective right and left front wheels of the automobile. The suspension unit 10 includes a high mount knuckle 11, a lower arm 12 (suspension member), a tie rod 14, a shock absorber 15, and a pair of upper arms 25.

The high mount knuckle 11 is a member made of an aluminum alloy, which rotatably supports the wheel T while being connected to the lower arm 12 and the shock absorber 15. The high mount knuckle 11 has a bearing support part 111, a knuckle lower part 112, a knuckle upper part 113, and a tie rod supporting part 114.

The bearing support part 111 is a cylindrical portion extending in the vehicle width direction. The bearing support part 111 supports an undepicted bearing part forming a rotation axis of the wheel T. A shaft of the wheel T is provided in the bearing support part 111 in an inserted manner.

The knuckle lower part 112 extends downward from the bearing support part 111. The knuckle lower part 112 has a knuckle lower-end part 116. The knuckle lower-end part 116 is disposed at the lower end part of the knuckle lower part 112 and is connected to the lower end part of a lower arm 152 of the shock absorber 15 via a lower joint 16 while being pivotally supported thereby.

The knuckle upper part 113 extends upward from the bearing support part 111. The knuckle upper part 113 has a knuckle upper-end part 115. The knuckle upper-end part 115 is disposed at the upper end part of the knuckle upper part 113 and is connected to respective one ends of a pair of upper arms 25 via upper joints 17 while being pivotally supported thereby. The respective other ends of the upper arms 25 are connected to the vehicle body in a vertically rotatable manner.

As shown in FIG. 1, the knuckle upper part 113 of the high mount knuckle 11 is bent inward in the vehicle width direction from the bearing support part 111 and then extends upward so as to be bent outward in the vehicle width direction. As a result, the knuckle upper-end part 115 is located above the upper end part of the wheel T. In other words, the bearing support part 111 is disposed in the inside of the wheel T, the knuckle upper-end part 115 is disposed above the wheel T, and the knuckle upper part 113 is bent inward in the vehicle width direction so as to avoid interference with the wheel T. As a result, the knuckle upper part 113 has an arcuate shape so as to connect the bearing support part 111 to the knuckle upper-end part 115. A knuckle axis L as a rotational axis of the high mount knuckle 11 is formed between the knuckle upper-end part 115 and the knuckle lower-end part 116.

The tie rod supporting part 114 (FIG. 1) extends rearward from the knuckle lower part 112 below the bearing support part 111. The tie rod supporting part 114 pivotally supports an end part 14S of the tie rod 14.

In the present embodiment, the high mount knuckle 11 and the lower arm 12 are each formed by hot forging of an aluminum alloy material (metal).

The lower arm 12 is a member having a roughly triangular shape in plan view. The lower arm 12 has a front bush support part 121 (first bush support part), a rear bush support part 122 (second bush support part), and a ball joint support part 123, which are each located at the corner of the triangle. The front bush support part 121 and the rear bush support part 122 are disposed at a longitudinal interval in the inside of the lower arm 12 in the vehicle width direction. A front bush 18 made of rubber is pressed into the front bush support part 121. Similarly, a rear bush 19 made of rubber is pressed into the rear bush support part 122. The lower arm 12 is supported by the undepicted vehicle body in a shakable manner via the front bush 18 and the rear bush 19. In this configuration, the lower arm 12 is shakable about an axis extending longitudinally through the front bush 18 and the rear bush 19. In other words, the ball joint support part 123 disposed on the outside in the vehicle width direction of the lower arm 12 is vertically movable with the axis as a center. The ball joint support part 123 also supports a ball joint 20.

The tie rod 14 extends from an undepicted steering gear box. The tie rod 14 has the end part 14S. The end part 14S is rotatably connected to the tie rod supporting part 114 of the high mount knuckle 11. When the tie rod 14 shuttles with steering of an automobile, the high mount knuckle 11 rotates around the knuckle axis L, and the wheel T is steered around the knuckle axis L.

The shock absorber 15 has an extensible hydraulic cylinder 151, the lower arm 152, and a spring 15S. The hydraulic cylinder 151 is a body part of the shock absorber 15 and extends and contracts with vertical movement of the wheel T in accordance with irregularity of a road surface. The spring 15S is disposed coaxially with the hydraulic cylinder 151 in the periphery of the upper part of the hydraulic cylinder 151, and exhibits a shock absorbing function through extension and contraction in accordance with extension and contraction of the hydraulic cylinder 151. The lower arm 152 is an arm portion that extends downward from the hydraulic cylinder 151 and is pivotally supported by the ball joint support part 123 of the lower arm 12 via the ball joint 20.

Such a suspension unit 10 is located between the vehicle body and the wheel T of the automobile and has a function of holding the wheel T (tire) to maintain a posture of the wheel T and a function of preventing a road surface condition (road noise) from being transmitted to the vehicle body. The members configuring the suspension unit 10 therefore require high security. Reducing weight of each member of the suspension unit 10 contributes to a reduction in below-spring weight of the automobile, leading to improvement in motor activity of the automobile and in ride comfort of a driver. Hence, weight reduction of the suspension unit 10 has a particularly high priority in weight reduction of the automobile. Although a steel plate or cast iron has been used for the suspension unit 10, aluminum alloy is increasingly used in recent years mainly in luxury cars. The member of the suspension unit 10 requires stiffness, yield strength, and fatigue strength against external force in various application directions. Furthermore, the members of the suspension unit 10 are also strictly evaluated for reliability under corrosive environment.

The aluminum alloy has a density of about one third of that of steel material while having a relatively high strength. It is therefore generally possible to reduce weight of the suspension unit 10 by about 40 to 60% by changing the material of the suspension unit 10 from the steel plate or cast iron to the aluminum alloy. In particular, an aluminum alloy having a high 0.2% proof stress or a tempered aluminum alloy typically provides a high weight reduction effect. Although heat-treated alloys such as 2000-series, 6000-series, and 7000-series alloys are suitable as such aluminum alloys in light of material strength, the 2000-series alloys and the 7000-series alloys have poor corrosion resistance compared with the 6000-series alloys. Hence, the 6000-series alloys having both high strength and high corrosion resistance, particularly 6082 alloy, 6061 alloy, and similar composition-modified alloys are desirably used for the suspension unit 10. Such 6000-series alloys are typically subjected to temper aging through T6 or T7 treatment.

Some of the members configuring the suspension unit 10, specifically the high mount knuckle 11 and the lower arm 12 are formed by hot forging. In the present embodiment, final shapes of such members are each formed through two to four hot forging steps. In such a case, free structure design is allowed because the degree of freedom of a shape is high compared with a sheet material or an extruded shape material, and thus any thicknesses or sectional shape can be achieved.

Figure 2:
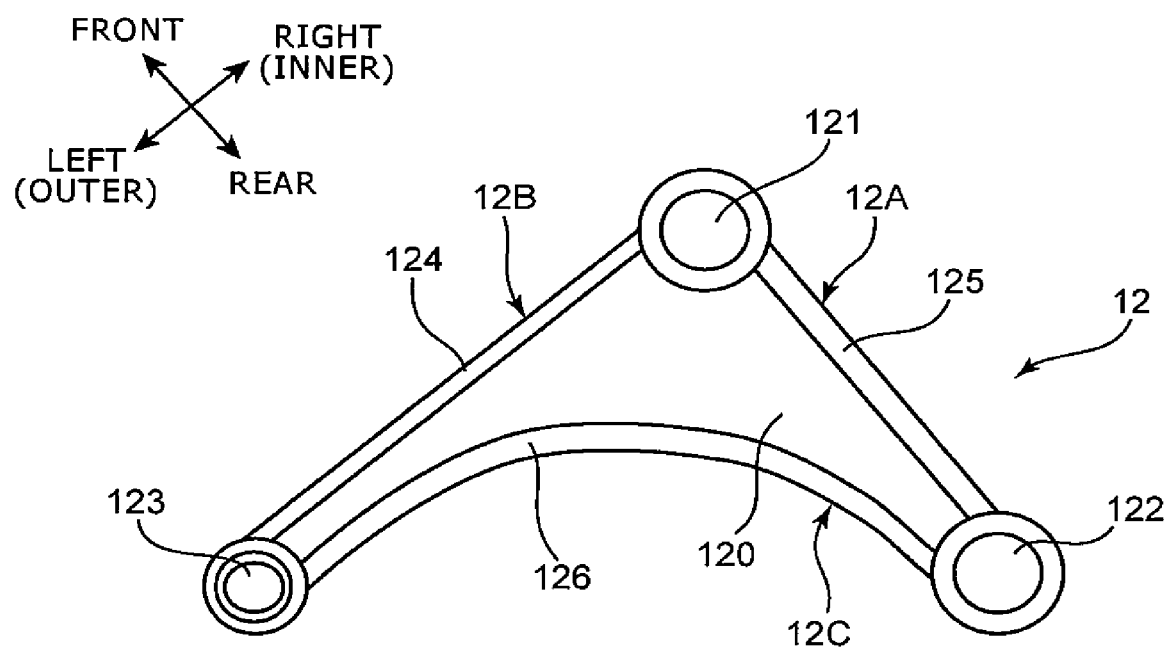
FIG. 2 is a plan view of the suspension member of the one embodiment of the invention.

FIG. 2 is a plan view of the lower arm 12 (suspension member) of the present embodiment. As shown in FIG. 1, the lower arm 12 is a member disposed so as to extend in a horizontal direction. As shown in FIG. 2, the lower arm 12 has an arm body 120 (body part). The arm body 120 has a first lateral part 12A, a second lateral part 12B, and a third lateral part 12C. The first lateral part 12A is a lateral part, extending in a vehicle longitudinal direction, of the arm body 120. The second lateral part 12B is a lateral part of the arm body 120, which is connected to a front-end part of the first lateral part 12A and extends outward in the vehicle width direction. The third lateral part 12C extends so as to connect a front-end part of the second lateral part 12B to a rear-end part of the first lateral part 12A. In the present embodiment, the third lateral part 12C is curved so as to gradually extend outward in the vehicle width direction as going forward (FIG. 2). As described above, the lower arm 12 is desirably formed by hot forging, and the average of 0.2% proof stresses of various portions of the arm body 120 is desirably 350 MPa or more.

The lower arm 12 further has the front bush support part 121 (first bush support part), the rear bush support part 122 (second bush support part), and the ball joint support part 123. The front bush support part 121 is disposed at a point at which the first lateral part 12A of the arm body 120 and the second lateral part 12B thereof intersect with each other. The rear bush support part 122 is disposed at a point at which the first lateral part 12A of the arm body 120 and the third lateral part 12C thereof intersect with each other. The ball joint support part 123 is disposed at a point at which the second lateral part 12B of the arm body 120 and the third lateral part 12C thereof intersect with each other.

In other words, the rear bush support part 122 is disposed behind the front bush support part 121 in the arm body 120. The ball joint support part 123 is disposed outside in the vehicle width direction of the front bush support part 121 in the arm body 120. The first lateral part 12A connects the front bush support part 121 to the rear bush support part 122, and the second lateral part 12B connects the front bush support part 121 to the ball joint support part 123. The third lateral part 12C connects the ball joint support part 123 to the rear bush support part 122.

Figure 3:
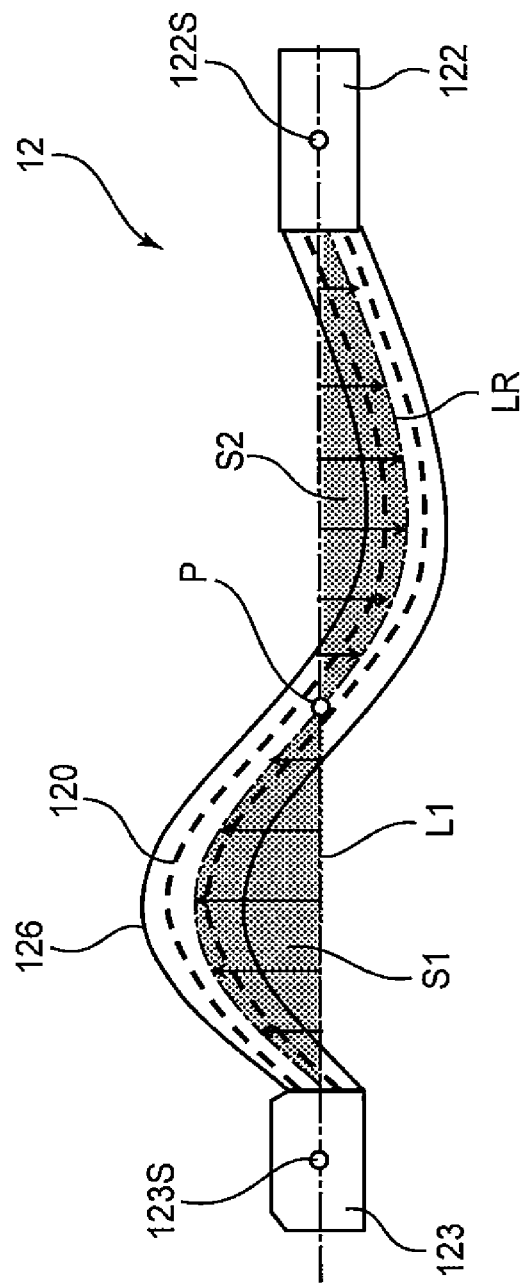
FIG. 3 is a side view of the suspension member of the one embodiment of the invention as viewed from behind and from the outside in a vehicle width direction.
Figure 4:
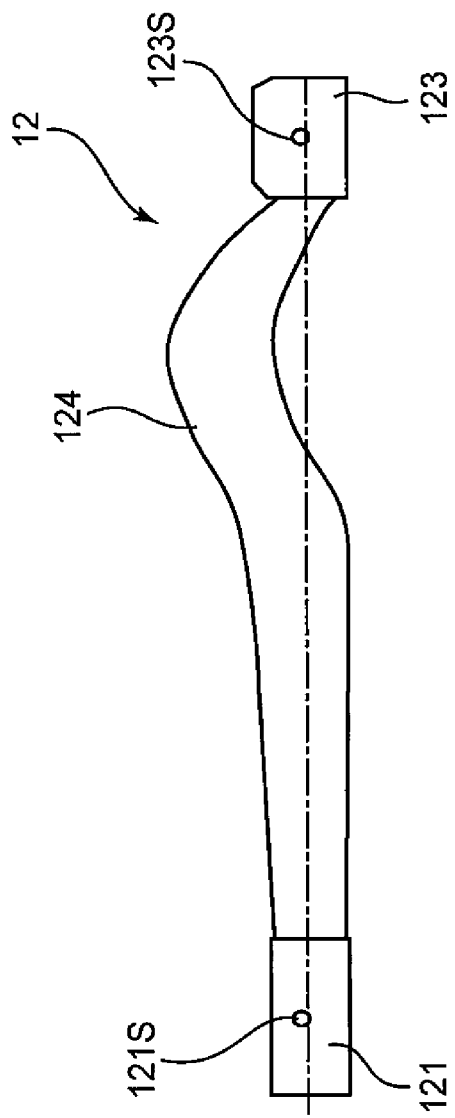
FIG. 4 is a front view of the suspension member of the one embodiment of the invention.
Figure 5:
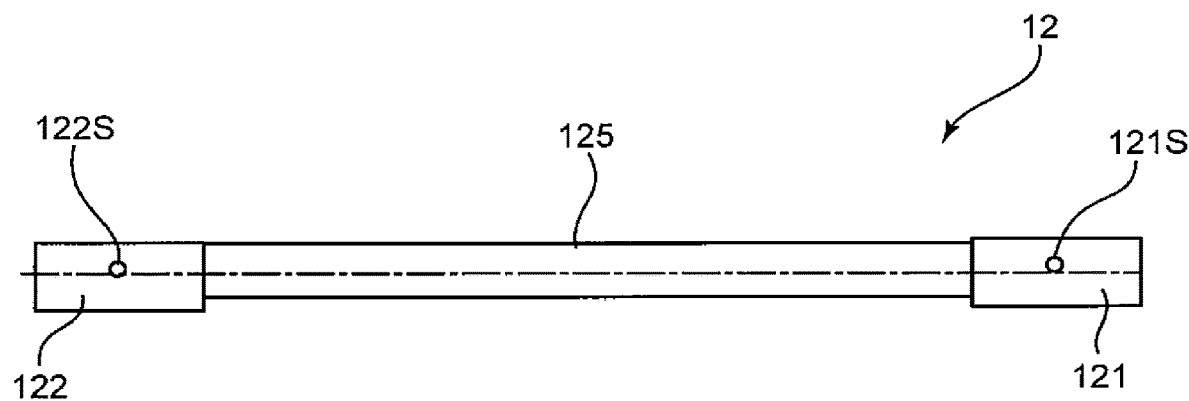
FIG. 5 is a side view of the suspension member of the one embodiment of the invention as viewed from the inside in the vehicle width direction.
Figure 6:
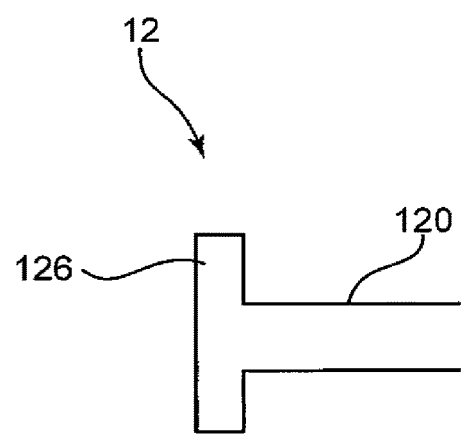
FIG. 6 is a sectional view of the suspension member of the one embodiment of the invention.

FIG. 3 is a side view of the lower arm 12 of the present embodiment as viewed from behind and from the outside in the vehicle width direction. FIG. 4 is a front view of the lower arm 12 of the present embodiment. FIG. 5 is a side view of the lower arm 12 of the present embodiment as viewed from the inside in the vehicle width direction. FIG. 6 is a sectional view of the lower arm 12 of the present embodiment.

Referring to FIGS. 3 to 5, the arm body 120 has a first rib 124, a second rib 125, and a third rib 126. The first rib 124 extends from the front bush support part 121 to the ball joint support part 123 at the second lateral part 12B. The first rib 124 includes a pair of upper and lower ribs projecting upward and downward from the arm body 120. As shown in FIG. 4, a portion of the first rib 124 on a side close to the front bush support part 121 extends along a roughly horizontal direction. A portion of the first rib 124 on a side close to the ball joint support part 123 has a curved shape slightly projecting upward. As shown in FIG. 5, the second rib 125 extends from the front bush support part 121 to the rear bush support part 122 in the first lateral part 12A. The second rib 125 includes a pair of upper and lower ribs projecting upward and downward from the arm body 120. As shown in FIG. 5, the second rib 125 extends along the roughly horizontal direction from the front bush support part 121 to the rear bush support part 122. The third rib 126 includes a pair of upper and lower ribs extending in an S shape in side view from the ball joint support part 123 to the rear bush support part 122 in the third lateral part 12C (see FIGS. 3 and 6).

When such a lower arm 12 is manufactured by hot forging, various restrictions (hereinafter, shape restrictions) are set on a shape of the lower arm 12 in light of preventing forging defects including underfill, wrinkle, and seizure, suppressing die cracking, and preventing metallographic abnormality. Typical shape restrictions include size of R of a corner portion, a die draft, minimum thickness, and height of a rib part. A hot-forged aluminum alloy material is subjected to deburring, and then subjected to solution treatment, hardening, and artificial temper aging as necessary. The material is then subjected to machining to attach a rubber bush, a ball joint, and a bracket to connections with other members.

The lower arm 12 having a roughly L shape in plan view most importantly has a strength (maximum load) against force applied in the vehicle longitudinal direction (from front to back) assuming that a tire collides with an obstacle while the vehicle is moving. An in-plane bending moment mainly occurs in the L-shaped lower arm 12 due to the force applied in the vehicle longitudinal direction. When the lower arm 12 is not notably deformed through buckling or the like, the maximum load Pmax received by the lower arm 12 is substantially equal to Mp/L at a point (place) at which "fully-plastic moment Mp of each part"/"distance L up to load point" is minimum. However, the third rib 126 at the third lateral part 12C in FIG. 2 is inclined with respect to the vehicle longitudinal direction and thus receives a compression load by a level corresponding to an inner product of the vehicle longitudinal direction and an extending direction of the third rib 126 (see a broken-line arrow of FIG. 13). Typically, the third rib 126 is (up and down) offset out of a surface to avoid interference with other members. In this case, an out-of-plane bending moment occurs in the third rib 126 due to a compression load. When the out-of-plane bending moment is thus produced in the third rib 126 due to the compression force and the out-of-plane offset, out-of-plane bending deformation occurs, and the amount of out-of-plane deformation gradually increases. The increase in the amount of out-of-plane deformation further increases the out-of-plane bending moment, so that the amount of out-of-plane deformation of the third rib 126 increases at an accelerated pace. The load received by the third rib 126 reaches the maximum load before large out-of-plane bending of the third rib 126 occurs, and the maximum load is greatly reduced compared with the fully-plastic moment Mp. Furthermore, after the third rib 126 is greatly out-of-plane bent, the load gradually decreases with an increase in displacement of the third rib 126. In this way, the third rib 126 in the third lateral part 12C particularly requires high strength against external force in the vehicle longitudinal direction, among the members of the lower arm 12.

As described above, the present embodiment is characterized by the shape of the third rib 126 to have high strength against external force in the vehicle longitudinal direction in the third lateral part 12C of the lower arm 12. Specifically, as shown in FIG. 3, a straight line, which connects the ball joint support part 123 (load center, support-part load point 123S) to the rear bush support part 122 (load center, rear load point 122S), is defined as first straight line L1. An S-shape curve, which is formed by connecting the vertically middle points between upper and lower end edges of the third rib 126 including the vertical rib pair to one another from the ball joint support part 123 to the rear bush support part 122, is defined as rib center curve LR. The first straight line L1 and the rib center curve LR intersects with each other at a predetermined intersection P. The absolute value of (1−S2/S1) satisfies Expression 1, where S1 is area of a first region defined by the straight line L1 and the rib center curve LR between the intersection P and the ball joint support part 123, and S2 is area of a second region defined by the straight line L1 and the rib center curve LR between the intersection P and the rear bush support part 122.

$$|(1-S2/S1)| \le 0.2 \qquad \text{Expression 1}$$

According to such a configuration, the third rib 126 including the vertical rib pair has a roughly S shape in side view, and when external force in the vehicle longitudinal direction is applied to the lower arm 12, the sum (S1) of the upward bending moments of the third rib 126 is substantially equal to the sum (S2) of the downward bending moments thereof. An out-of-plane buckling mode of the third rib 126 is therefore controlled to be a roughly S shape, which increases the maximum load to be received by the third rib 126 and suppresses a reduction in load after application of the maximum load. That is, the lower arm 12 can withstand a large load, which suppresses damage and breakage of the lower arm 12.

Figure 7:
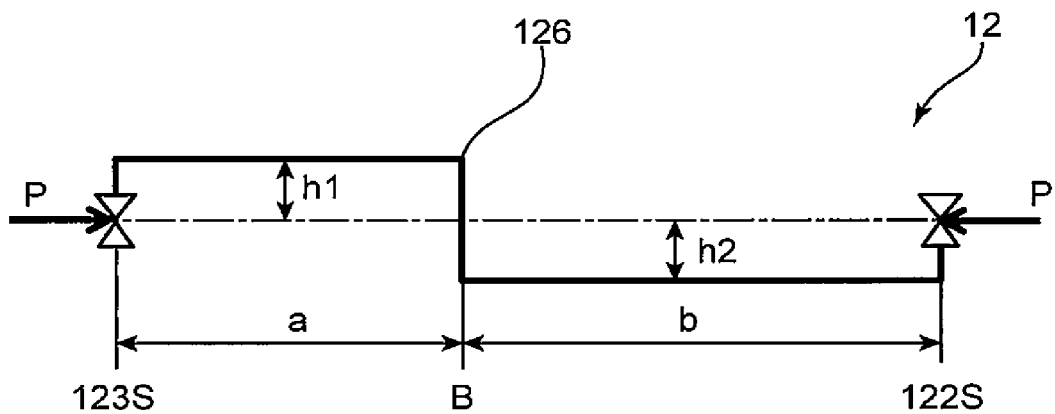
FIG. 7 is a schematic view illustrating a beam model of a rib of the suspension member of the one embodiment of the invention when an axial force P is applied to the rib.
Figure 8:
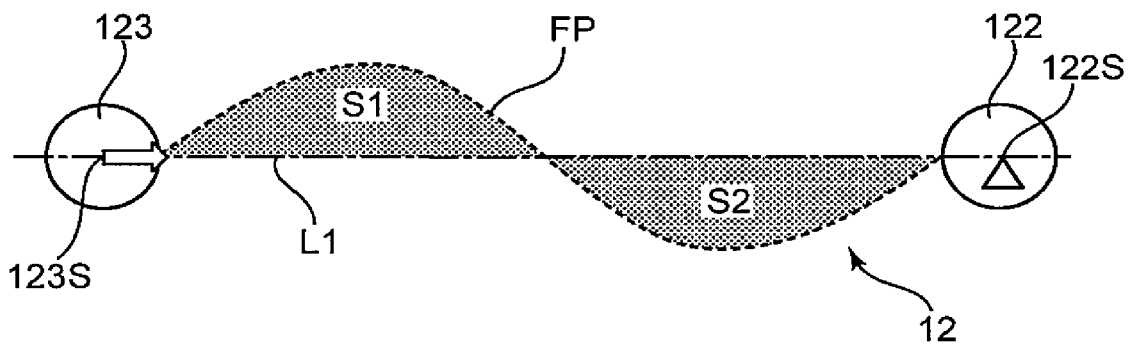
FIG. 8 is a model diagram used for numerical analysis of the rib of the suspension member of the one embodiment of the invention.
Figure 9:
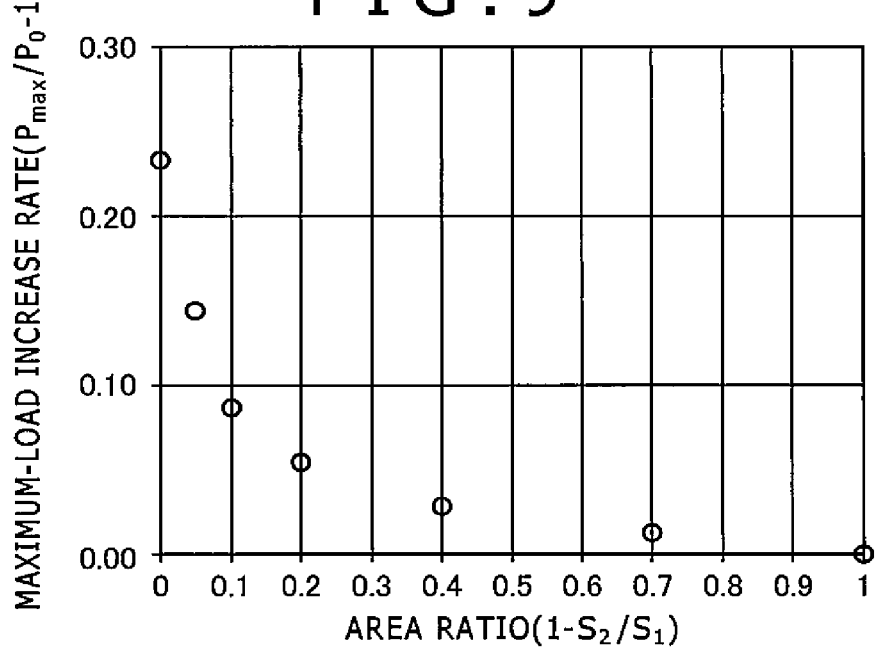
FIG. 9 is a graph showing a relationship of an area ratio between a first region and a second region and a maximum-load increase rate of the rib of the suspension member of the one embodiment of the invention.
Figure 10:
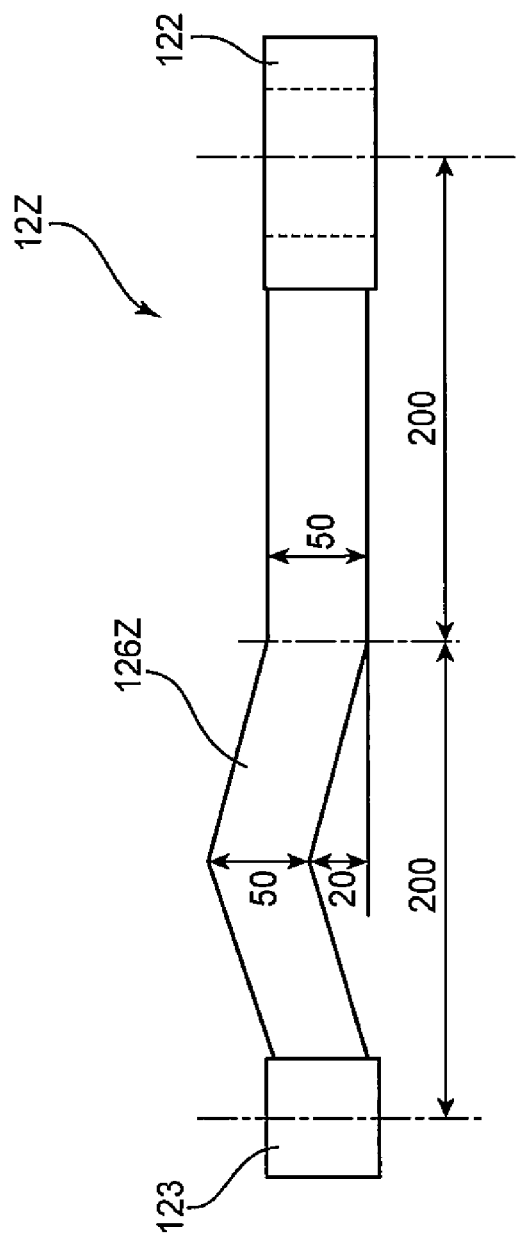
FIG. 10 shows a model shape in numerical analysis of another suspension member compared with the suspension member of the one embodiment of the invention.
Figure 11:
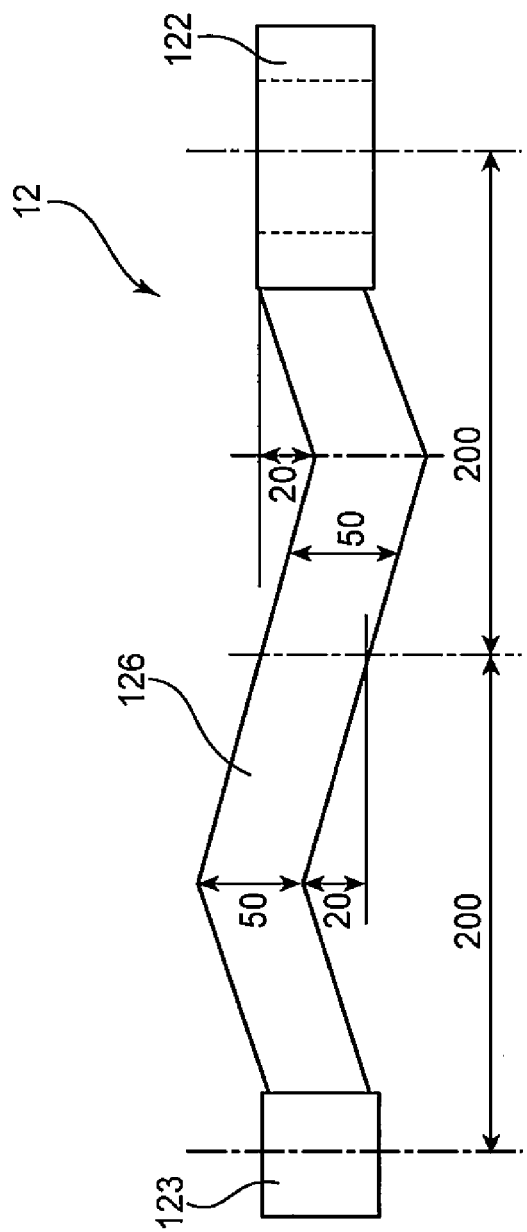
FIG. 11 shows a model shape in numerical analysis of the suspension member of the one embodiment of the invention.
Figure 12:
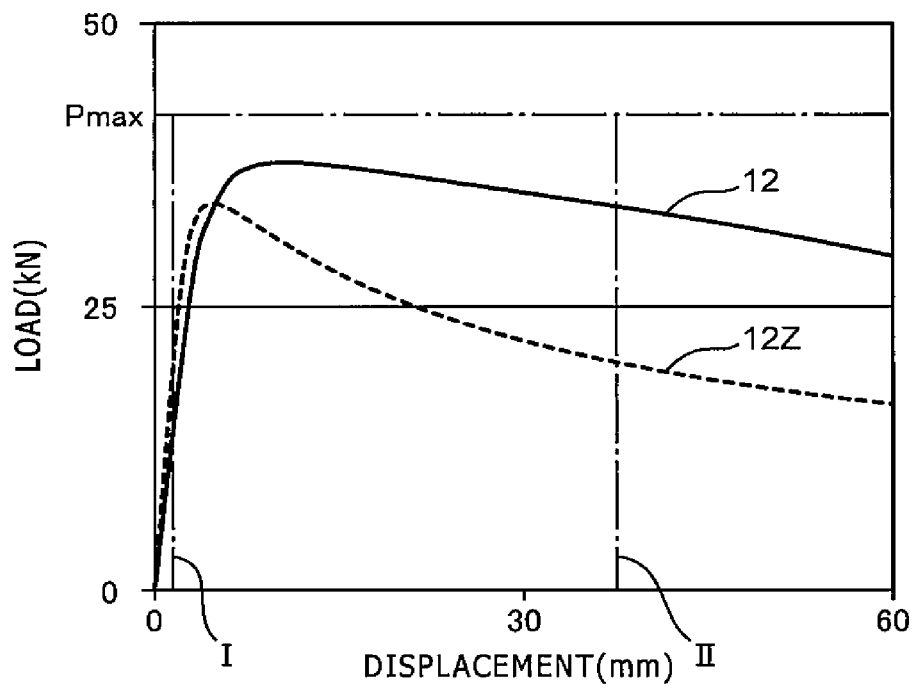
FIG. 12 is a graph showing a relationship of displacement and a load of each of the suspension member of the one embodiment of the invention and another suspension member.
Figure 13:
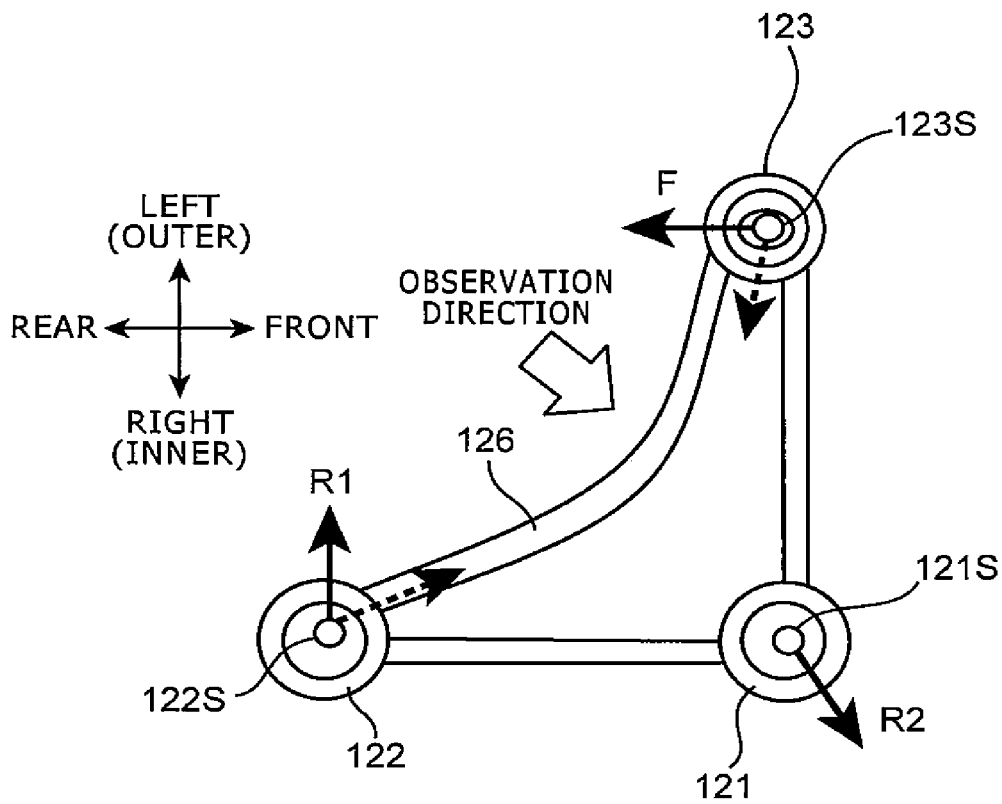
FIG. 13 is a schematic view illustrating distribution of force when external force in a vehicle longitudinal direction is applied to the suspension member.
Figure 14:
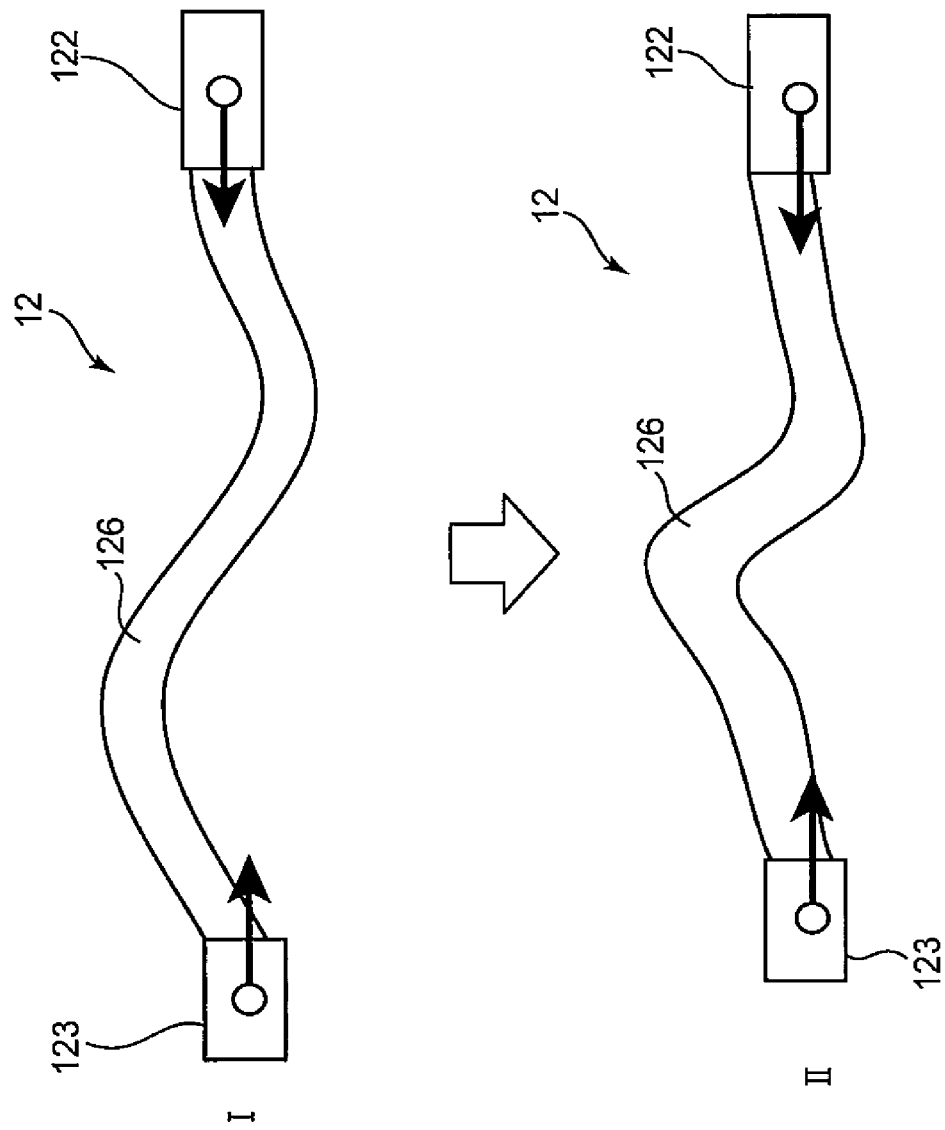
FIG. 14 is a schematic view illustrating a deformation mode of the suspension member of the one embodiment of the invention.
Figure 15:
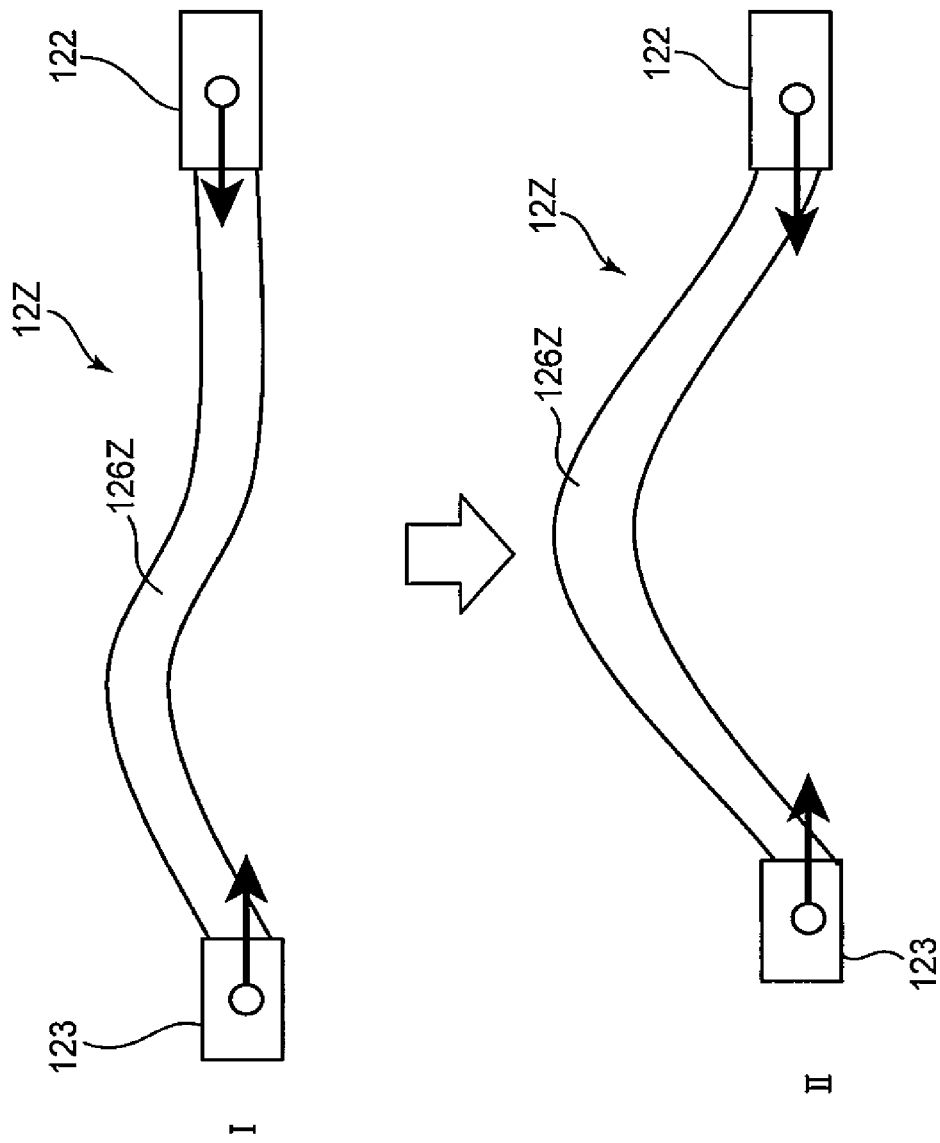
FIG. 15 is a schematic view illustrating a deformation mode of another suspension member to be compared with the suspension member of the one embodiment of the invention.

Functions of the invention to derive such a shape of the third rib 126 are described below in order. FIG. 7 is a schematic view illustrating a beam model of the third rib 126 of the lower arm 12 when an axial force P is applied to the third rib 126. FIG. 8 is a model diagram, which is used for numerical analysis as described later, of the third rib 126. FIG. 9 is a graph showing a relationship of an area ratio between the first region and the second region and a maximum-load increase rate of the third rib 126. FIG. 10 shows a model shape of another lower arm 12Z used in the numerical analysis. FIG. 11 shows a model shape of the lower arm 12 suspension member) of the present embodiment used in the numerical analysis. FIG. 12 is a graph showing a relationship of displacement and a load of each lower arm. FIG. 13 is a schematic view illustrating distribution of force when external force in the vehicle longitudinal direction is applied to the lower arm 12 (12Z). Furthermore, FIG. 14 is a schematic view illustrating a deformation mode of the lower arm 12 of the present embodiment, and FIG. 15 is a schematic view illustrating a deformation mode of another lower arm 12Z. FIGS. 14 and 15 each correspond to a side view of the lower arm as viewed from the observation direction in FIG. 13.

Unlike the third rib 126 of the lower arm 12 of the present embodiment, if the ribs have only one out-of-plane offset direction, i.e., if part of a third rib 126Z is offset only upward as in another lower arm 12Z as shown by I in FIG. 15, an out-of-plane bending moment only in the same (upward) direction occurs in the third rib 126Z when a longitudinal external force is applied to the lower arm 12Z. In such a case, out-of-plane bending deformation of the third rib 126Z proceeds rapidly, i.e., the out-of-plane bending deformation easily (early) occurs. On the other hand, when the out-of-plane offset direction intentionally includes two vertical (upward and downward) directions and thus the third rib 126 has a profile of the roughly S shape as in the third rib 126 of the lower arm 12 of the present embodiment, a profile of the out-of-plane bending moment in the third rib 126 is inverted at an intermediate intersection P. As a result, when the longitudinal external force is applied to the lower arm 12, the out-of-plane deformation amount is suppressed and the bending deformation mode can be adjusted to the roughly S shape, which increases the maximum load and thus makes it possible to extremely suppress the load reduction.

To achieve such a deformation mode, it is necessary that the intersection P of the first straight line L1, which connects the ball joint support part 123 to the rear bush support part 122, and the rib center curve LR is substantially not displaced when the longitudinal external force is applied to the lower arm 12. In other words, the area S1 of the first region and the area S2 of the second region are necessary to be roughly equal to each other in FIG. 3.

A beam model is assumed, in which axial force P is exerted on the two respective ends of the third rib 126. A range from a support-part load point 123S of the ball joint support part 123 to a point of length a is upward offset by a height h1. A range from a rear load point 122S of the rear bush support part 122 to a point of length b is downward offset by a height h2. An offset-direction changing point is defined as B, and flexural rigidity of the third rib 126 is defined to be fixed as EI. A deflection equation on the third rib 126 is solved using a known material mechanics, so that vertical displacement δB of the point B is given by Expression 2.

$$\delta_B = \frac{Pab}{2EI(a+b)}(h_1 a - h_2 b) \qquad \text{Expression 2}$$

When $\delta_B=0$ is established in Expression 2, the point B is not vertically displaced and thus acts as a node of out-of-plane bending deformation, achieving the roughly S-shape out-of-plane deformation of the third rib 126. Expression 3 is therefore derived from Expression 2 to satisfy the condition ($\delta_B=0$).

$$h_1 a = h_2 b \qquad \text{Expression 3}$$

To generalize Expression 3, when the area S1 is substantially equal to the area S2, the roughly S-shape deformation of the third rib 126 is achieved.

EXAMPLE

To confirm the effects of the invention, analysis based on the finite element method (FEM) was performed using ABAQUS as a known analysis tool. In this analysis, a rod link 400 mm long having a rectangular solid section 40 mm high and 40 mm wide is used as an object, and centroids of the sections are shifted to draw an S shape as shown in FIG. 8, and then a relationship of a load and displacement is calculated. The centroid profile FP in FIG. 8 corresponds to the S-shape profile drawn by the centroids of the sections. As shown in FIG. 8, a position corresponding to the support-part load point 123S of the ball joint support part 123 corresponds to a load point, and external force is applied toward the inside (toward the rear bush support part 122). The rear load point 122S of the rear bush support part 122 corresponds to a bound point (fixed point).

Areas of the two regions defined by the straight line L1 passing through the load point and the bound point and the centroid profile FP are represented as S1 and S2, respectively. In this analysis, while S1 is fixed to 1000 mm$^2$, S2 is varied between 0 and 1000 mm$^2$ to compare load-and-displacement relationships to one another. FIG. 9 shows analysis results. In FIG. 9, the horizontal axis shows (1−S2/S1), and the vertical axis shows a maximum-load increase rate. That maximum-load increase rate corresponds to an increase rate of each maximum load to a maximum load at a condition of S2=0 mm$^2$ under each condition where S2 is set to a predetermined area. As shown in FIG. 9, the maximum load increases by at least 5% in the case where (1−S2/S1) is 0.20 or less, showing that the effects of the invention are prominently exhibited. Such effects were confirmed to be exhibited in each of the cases of S1>S2 and S1<S2.

Based on the above-described analysis results, an analysis to confirm the effects of the invention was further performed with a simple, roughly L-shaped suspension member as an object. In FIGS. 10 and 11, the lower arms 12Z and 12 are each shown in millimeter. The lower arm 12Z of FIG. 10 is shaped to be bent upward on a side close to the ball joint support part 123 with the longitudinal center of the third rib 126Z as a boundary. On the other hand, the third rib 126Z has a horizontally flat shape on a side close to the rear bush support part 122 with the center as the boundary. In the lower arm 12 of FIG. 11, the third rib 126 has an S shape in side view as described above. The lower arm 12Z of FIG. 10 and the lower arm 12 of FIG. 11 have the same mass. FIG. 12 shows a relationship of displacement and a load for each of the lower arms 12 and 12Z. As shown in FIG. 12, it is confirmed that forming the third rib 126 to have the roughly S shape increases the maximum load by about 10% and suppresses the reduction in load after the maximum load is received.

As described above, the load condition on the lower arm 12 (lower arm 12Z) as in the above-described analysis corresponds to the condition that the backward external force F is applied to the support-part load point 123S of the ball joint support part 123 in FIG. 13. In such a case, drags R1 and R2 are produced at the rear load point 122S of the rear bush support part 122 and the front load point 121S of the front bush support part 121, respectively. A compression force including a component force of the external force F is applied to the support-part load point 123S of the ball joint support part 123, and a compression force including a component force of the drag R1 is applied to the rear load point 122S of the rear bush support part 122 (see broken-line arrows in FIG. 13).

The states I and II in FIGS. 14 and 15 correspond to the displacements I and II, respectively, in the graph of FIG. 12. In the lower arm 12, as shown in FIG. 14, application of compression force to the third rib 126 causes individual bending of an upper projecting portion and a lower projecting portion collectively having the S shape. As a result, the third rib 126 compressively deforms toward the intersection P (FIG. 3) of the third rib 126 (I→II). This suppresses the amount of out-of-plane deformation of the third rib 126, and increases the maximum load received by the lower arm 12 as shown in FIG. 12, making it possible to suppress a reduction in load. Consequently, the lower arm 12 secures the strength against external force in the vehicle longitudinal direction.

On the other hand, for the lower arm 12Z, as shown in FIG. 15, application of compression force to the third rib 126Z causes bending of the third rib 126Z such that an upward projecting portion of the third rib 126Z further projects upward (I→II). This increases the amount of out-of-plane deformation of the third rib 126Z of the lower arm 12Z compared with the third rib 126 of the lower arm 12.

As shown in FIG. 13, when the backward external force F is produced at the support-part load point 123S of the ball joint support part 123, the drag R2 is produced toward the outside of the lower arm 12 at the front load point 121S of the front bush support part 121. As a result, tensile stress is produced at the first lateral part 12A and the second lateral part 12B (FIG. 3) of the lower arm 12. Hence, each of the shapes of the first lateral part 12A and the second lateral part 12B does not act as a trigger of the bending deformation of the third lateral part 12C, or influence of such shapes can be substantially disregarded. That is, the trigger of the out-of-plane bending deformation of the third lateral part 12C of the lower arm 12 is mainly performed by the third rib 126 of the third lateral part 12C. Although the curvature, dimension, or thickness of the third rib 126 varies the value of the maximum load in FIG. 12, the deformation mode of the third rib 126 (third lateral part 12C) can be controlled by satisfying the above-described Expression 1 as long as the effects of the invention are exhibited.

The lower arm 12 (suspension member) of one embodiment of the invention has been described. According to the lower arm 12, when external force in a vehicle longitudinal direction is applied to the lower arm 12, the out-of-plane offset direction of the third lateral part 12C is divided into two vertical (upward and downward) directions with the intersection P as a boundary. As a result, a roughly S-shaped bending deformation mode of the third lateral part 12C is achieved, and the amount of out-of-plane deformation is reduced. This increases the maximum load received by the lower arm 12, making it possible to suppress a reduction in load. Consequently, the lower arm 12 secures the strength against the external force in the vehicle longitudinal direction.

The lower arm 12 is desirably made of aluminum alloy. In such a case, weight of the lower arm 12 can be reduced compared with a lower arm made of steel. In addition, the lower arm 12 (arm body 120) desirably has an average 0.2%-proof stress of 350 MPa or more and is desirably formed by hot forging. In such a case, the lower arm 12 can meet a desired strength with reduced weight compared with a case of using another aluminum material.

The invention is not limited to the described modes. The invention may include the following modified embodiments.

Figure 16:
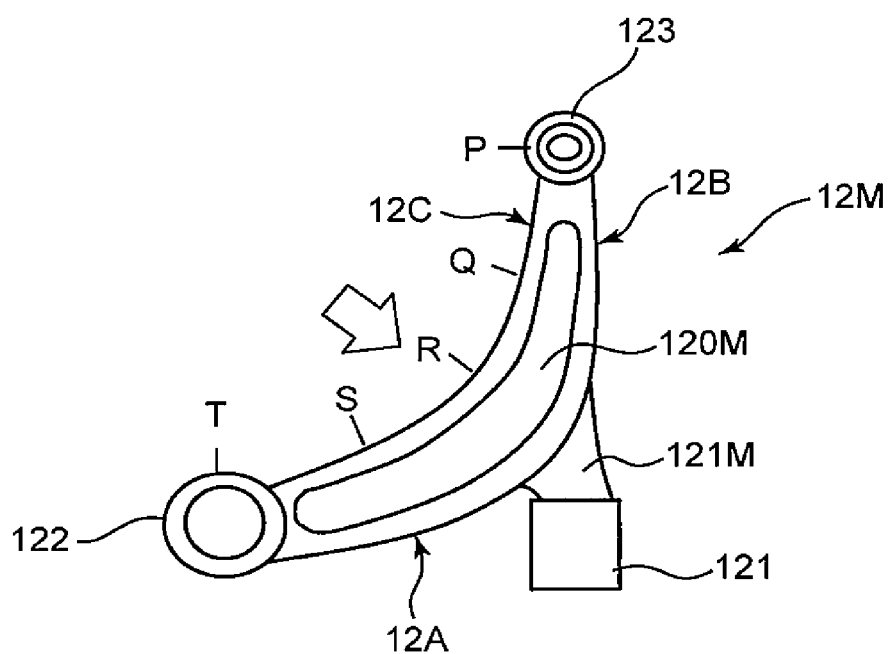
FIG. 16 is a plan view of a suspension member of a modified embodiment of the invention.

FIG. 16 is a plan view of a lower arm 12M of a modified embodiment of the invention. FIG. 17 is a side view of the lower arm 12M. In FIGS. 16 and 17, portions having the same functions as those of the lower arm 12 according to the above-described embodiment are designated by the same reference numerals as in FIG. 3. The respective symbols P, Q, R, S, and T have the same positions between FIGS. 16 and 17.

In the present modified embodiment, the arm body 120M of the lower arm 12M has an arcuate shape connecting the ball joint support part 123 to the rear bush support part 122. The front bush support part 121 is provided at a front end of a leg part 121M extending from the arm body 120M.

In such a lower arm 12M, when the third lateral part 12C is observed in side view as shown by an arrow in FIG. 16, the third rib 126 also has an S shape as shown in FIG. 17. Satisfying the above-described Expression 1 suppresses the out-of-plane deformation of the third rib 126. In addition, this increases the maximum load received by the lower arm 12M, making it possible to suppress a reduction in load. Consequently, the lower arm 12M secures the strength against the external force in the vehicle longitudinal direction.

This application claims the benefits of priority to Japanese Patent Application No. 2018-121458, filed Jun. 27, 2018. The entire contents of the above application are herein incorporated by reference.

What is claimed is:

1. A vehicle suspension member made of metal, comprising:
  a body part;
  a first bush support part disposed in the body part;
  a second bush support part disposed behind the first bush support part in the body part; and
  a ball joint support part disposed outside in a vehicle width direction of the first bush support part in the body part,
  where the body part includes
  a first lateral part to connect the first bush support part to the second bush support part,
  a second lateral part to connect the first bush support part to the ball joint support part,
  a third lateral part to connect the ball joint support part to the second bush support part, and
  a vertical pair of ribs extending from the ball joint support, part to the second bush support part in the third lateral part,
  wherein a straight line, connecting the ball joint support part to the second bush support part, intersects at a predetermined intersection with a curved line formed by connecting to one another vertically middle points between upper end edges and lower end edges of the vertical pair of ribs from the ball joint support part to the second bush support part, and
  $|(1-S2/S1)| \leq 0.2$ is satisfied, where S1 is area of a first region defined by the straight line and the curved line between the intersection and the ball joint support part, and S2 is area of a second region defined by the straight line and the curved line between the intersection and the second bush support part.

2. The vehicle suspension member according to claim 1, wherein the body part is made of aluminum alloy.

3. The vehicle suspension member according to claim 2, wherein the body part has an average 0.2%-proof stress of 350 MPa or more and is formed by hot forging.

* * * * *